US012654860B2

(12) United States Patent
Mueller et al.

(10) Patent No.: US 12,654,860 B2
(45) Date of Patent: Jun. 16, 2026

(54) BARRIER SYSTEM AND METHOD FOR A FLIGHT DECK OF AN AIRCRAFT

(71) Applicant: THE BOEING COMPANY, Arlington, VA (US)

(72) Inventors: Andrew William Mueller, Mukilteo, WA (US); Christopher Lyle Schwitters, Bothell, WA (US)

(73) Assignee: The Boeing Company, Arlington, VA (US)

( * ) Notice: Subject to any disclaimer, the term of this patent is extended or adjusted under 35 U.S.C. 154(b) by 92 days.

(21) Appl. No.: 18/489,487

(22) Filed: Oct. 18, 2023

(65) Prior Publication Data

US 2025/0128815 A1     Apr. 24, 2025

(51) Int. Cl.
B64D 11/00          (2006.01)

(52) U.S. Cl.
CPC ................................ B64D 11/0023 (2013.01)

(58) Field of Classification Search
CPC ................................................ B64D 11/0023
See application file for complete search history.

(56) References Cited

U.S. PATENT DOCUMENTS

| | | | | |
|---|---|---|---|---|
| 4,911,219 | A * | 3/1990 | Dalrymple ............. | B61D 19/02 |
| | | | | 160/202 |
| 8,038,100 | B2 * | 10/2011 | Osborne ............. | E05B 65/0811 |
| | | | | 244/129.5 |
| 10,252,809 | B2 * | 4/2019 | Cabourg ................ | B64D 25/00 |
| 10,926,879 | B2 * | 2/2021 | Bonnefoy .......... | B64D 11/0023 |
| 11,305,860 | B2 * | 4/2022 | Movsesian ........... | B64C 1/1461 |
| 12,084,164 | B2 * | 9/2024 | Movsesian ........... | B64C 1/1461 |
| 12,234,017 | B2 * | 2/2025 | Davis ................. | E05D 15/0686 |
| 2018/0346091 | A1 | 12/2018 | Movesian | |

OTHER PUBLICATIONS

U.S. Appl. No. 17/966,971, filed Oct. 17, 2022, to Movsesian.

* cited by examiner

*Primary Examiner* — Brian M O'Hara
(74) *Attorney, Agent, or Firm* — Joseph M. Butscher; Carroll, Hoette & Butscher, LLC

(57) ABSTRACT

An aircraft includes a flight deck including a flight deck door configured to be moved between an open position and a closed position. A secondary barrier door is moveably coupled to one or more monuments. The secondary barrier door is configured to linearly slide between a stowed position in which a path to the flight deck is open, and a deployed position in which the path to the flight deck is closed.

20 Claims, 10 Drawing Sheets

BARRIER SYSTEM AND METHOD FOR A FLIGHT DECK OF AN AIRCRAFT

FIELD OF THE DISCLOSURE

Examples of the present disclosure generally relate to barrier systems and methods for a flight deck of an aircraft.

BACKGROUND OF THE DISCLOSURE

Vehicles such as commercial aircraft are used to transport passengers between various locations. A commercial aircraft includes a flight deck (such as a cockpit) in which one or more pilots operate the aircraft.

Flight deck doors are used to selectively open and close a flight deck. During a flight, a flight deck door is typically locked in a closed position to prevent passengers from entering into the flight deck. The flight deck door can be opened during a flight to allow crew members to access lavatory facilities, receive meals, and/or switch positions for resting purposes.

The opening and closing of the flight deck door (referred to as "door transition") can reduce protective benefits of the flight deck door. In particular, when the flight deck door is opened, the flight deck is generally open. In order to ensure that passengers cannot enter into the flight deck during a door transition, a galley cart can be moved in position to provide a barrier to the flight deck. However, individuals may be able to move the galley cart, and gain access to the flight deck.

SUMMARY OF THE DISCLOSURE

A need exists for a barrier system and a method for preventing access to a flight deck during a door transition. Further, a need exists for an efficient and effective system and method for providing a secondary barrier to a flight deck.

With those needs in mind, certain examples of the present disclosure provide an aircraft including ga flight deck including a flight deck door configured to be moved between an open position and a closed position, and one or more monuments. A secondary barrier door is moveably coupled to the one or more monuments. The secondary barrier door is configured to linearly slide between a stowed position in which a path to the flight deck is open, and a deployed position in which the path to the flight deck is closed.

In at least one example, the one or more monuments include a first monument across an aisle from a second monument. The secondary barrier door is moveably coupled to the first monument. For example, the secondary barrier door is slidably coupled to the first monument through one or more bearings. The one or more bearings can be secured to an aft portion of the first monument. The second monument can include one or more securing devices configured to securely lock the secondary barrier door in the deployed position. In at least one example, a closed security vestibule is defined between the flight deck, the first monument, the second monument, and the secondary barrier door in the deployed position.

In at least one example, the secondary barrier door extends across the path in the deployed position.

The secondary barrier door can include a main body having a frame including a plurality of panels. The secondary barrier door can also include a moveable upper panel configured to be moved between a retracted position and an extended position.

A covering wall can be secured to the one or more monuments. A retaining chamber is defined between the covering wall and the one or more monuments. The secondary barrier wall in the stowed position is disposed within the retaining chamber.

Certain examples of the present disclosure provide a method, including moving a flight deck door between a closed position and an open position; and moving a secondary barrier door between a stowed position when the flight deck door is in the closed position, and a deployed position when the flight deck door is in the open position. Said moving includes linearly sliding the secondary barrier door between the stowed position and the deployed position. The secondary barrier door is moveably coupled to one or more monuments. A path to the flight deck is open when the secondary barrier door is in the stowed position. The path to the flight deck is closed when the secondary barrier door is in the deployed position.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Examples of the present disclosure provide a secondary barrier door that is moveably coupled to one or more monuments aft (that is, behind) a flight deck (such as a cockpit). The secondary barrier door is slidably secured to the monument(s), and is configured to linearly slide between a stowed position, in which a path to the flight deck is open, and a deployed position, in which the path to the flight deck is closed. In the deployed position, the secondary barrier door closes out an area between a passenger seating area and a primary flight deck door. The secondary barrier door provides additional protection for the flight deck. The secondary barrier door can be deployed during a flight when crew members open the flight deck door to access lavatory facilities, transfer meals, and/or switch crew positions for crew rest purposes.

Figure 1:
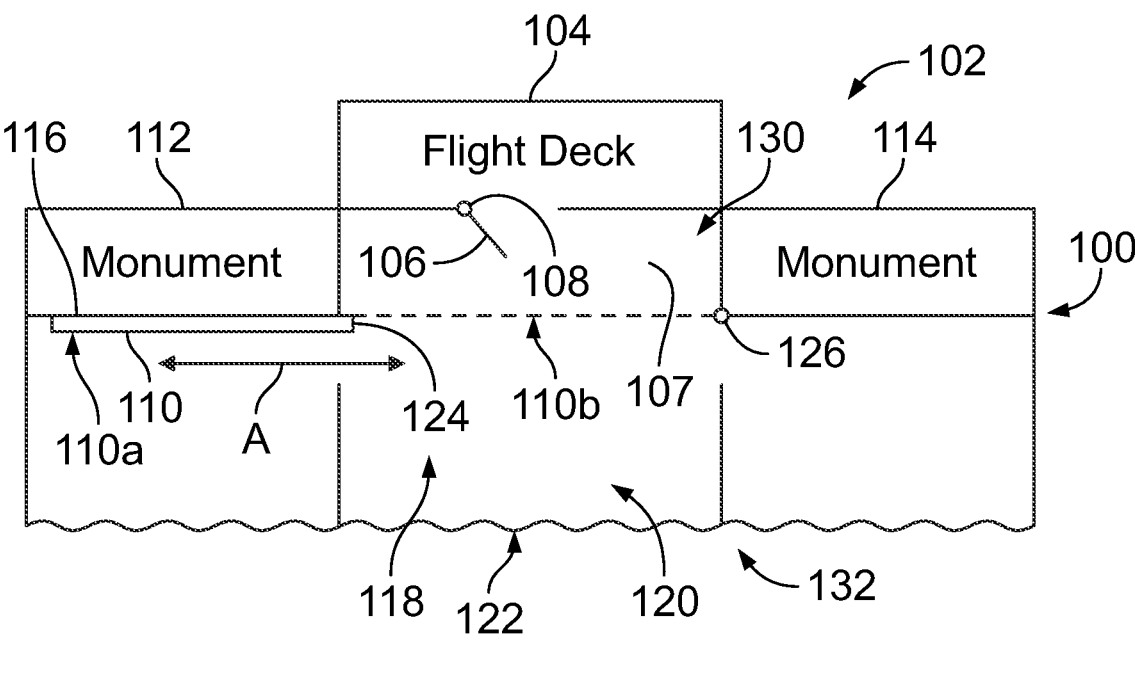
FIG. 1 illustrates a simplified top view of a portion of an internal cabin of an aircraft, according to an example of the present disclosure.

FIG. 1 illustrates a simplified top view of a portion of an internal cabin 100 of an aircraft 102, according to an example of the present disclosure. The internal cabin 100 includes a flight deck 104 (such as a cockpit) in which one or more pilots operate the aircraft 102. A primary flight deck door 104 is configured to be opened and closed to selectively allow and prevent access into the flight deck 104. The flight deck door 104 is generally reinforced and configured to be securely locked into a closed position. The flight deck door 104 generally extends between a floor 107 of the internal cabin 100 and to and into a frame, thereby reducing any open areas therebetween in the closed position. The flight deck door 104 is configured to pivot about a pivot axis 108, such as via one or more hinges, between the open position and the closed position. The pivot axis 108 is generally vertical in relation to the floor 107. In this manner, the flight deck door 104 is configured to pivot about a vertical axis between the open and closed position.

In order to protect the flight deck 104 during a door transition, a secondary barrier door 110 is moveably coupled to one or more monuments 112 (for example, a first monument), 114 (for example, a second monument) that are aft (that is, rearwardly disposed) from the flight deck 104. For example, the monument 112 can be a partition, a lavatory, a closet, a galley, or the like. Similarly, the monument 114 can be a partition, a lavatory, a closet, a galley, or the like. The monument 112 is across an aisle 122 from the monument 114. The secondary barrier door 110 is moveably secured to an aft portion 116 of the monument 112 (or the monument 114). In at least one example, the secondary barrier door 110 is slidably coupled to the aft portion 116 of the monument 114, such as through one or more bearings, rails, and/or the like. The secondary barrier door 110 is configured to linearly slide in the directions of arrows A between a stowed position 110a, and a deployed position 110b. Optionally, the secondary barrier door 110 can be coupled to a forward portion of the monument 114. As another example, the secondary barrier door 110 can be coupled to a portion of the monument 114 that is between the forward portion and the aft portion.

In the stowed position 110a, the secondary barrier door 110 is substantially disposed over the aft portion 116 of the monument, such that a path 118 to the flight deck 104 is open. The path 118 can be a forward end 120 of the aisle 122 within the internal cabin 100.

In the deployed position 110b, the secondary barrier door 110 extends across the path 118, thereby providing a closed barrier that blocks access to the flight deck 104. In the deployed position 110b, the secondary barrier door 110 extends between the monument 112 and the monument 114. In at least one example, an end 124 of the secondary barrier door 110 secures to one or more securing devices 126, such as latch(es) or lock(s), on the monument 114 to securely lock the secondary barrier door 110 in the deployed position 110b. The securing device(s) 126 can be manual locks, electronic locks, electromechanical locks, and/or the like. The end 124 of the secondary barrier door 110 can also include a handle, strap, or the like that is configured to allow an individual to grasp the secondary barrier door 110 and pull the secondary barrier door 110 into the deployed position 110b.

When the secondary barrier door 110 (which is aft from the flight deck door 106) is in the deployed position 110b, a closed security vestibule 130 is defined between the flight deck 104, the monument 112, the monument 114, and the secondary barrier door 110. The closed security vestibule 130 is closed off from a passenger area 132 of the internal cabin 100. As such, the secondary barrier door 110 in the deployed position 110b provides a secure barrier that prevents access to the flight deck 104, even if the flight deck door 106 is in the open position.

As noted, the flight deck door 106 is configured to pivot between an open position and a closed position. In contrast, the secondary barrier door 110 is configured to linearly slide in the directions of arrows A between the stowed position 110a and the deployed position 110b.

As described herein, the aircraft 102 includes the flight deck 104 including the flight deck door 106, which is configured to be moved between an open position and a closed position. The secondary barrier door 110 is moveably coupled to one or more of monuments 112 and/or 114. The secondary barrier door 110 is configured to be linearly slid between the stowed position 110a in which the path to the flight deck 104 is open, and the deployed position 110b in which the path 118 to the flight deck 104 is closed.

Figure 2:
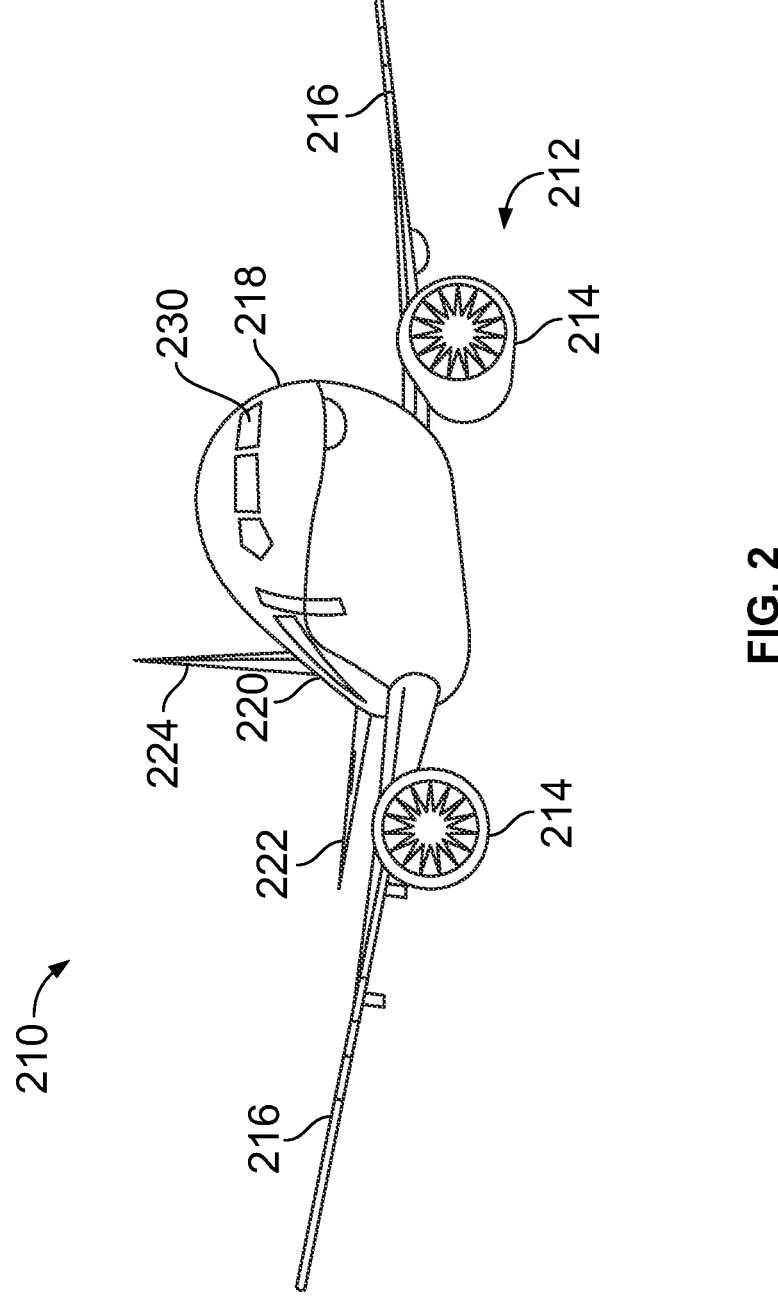
FIG. 2 illustrates a perspective front view of an aircraft, according to an example of the present disclosure.

FIG. 2 illustrates a perspective front view of an aircraft 210, according to an example of the present disclosure. The aircraft 210 is an example of the aircraft 102, shown in FIG. 1. The aircraft 210 includes a propulsion system 212 that includes engines 214, for example. Optionally, the propulsion system 212 may include more engines 214 than shown. The engines 214 are carried by wings 216 of the aircraft 210. In other examples, the engines 214 may be carried by a fuselage 218 and/or an empennage 220. The empennage 220 may also support horizontal stabilizers 222 and a vertical stabilizer 224.

The fuselage 218 of the aircraft 210 defines an internal cabin 230, which includes a flight deck, one or more work sections (for example, galleys, personnel carry-on baggage areas, and the like), one or more passenger sections (for example, first class, business class, and coach sections), one or more lavatories, and/or the like. The internal cabin 230 is an example of the internal cabin 100, as shown in FIG. 1.

Alternatively, instead of an aircraft, examples of the present disclosure may be used with various other vehicles, such as automobiles, buses, locomotives and train cars, watercraft, and the like. Further, embodiments of the present disclosure may be used with respect to fixed structures, such as commercial and residential buildings.

Figures 3A, 3B:
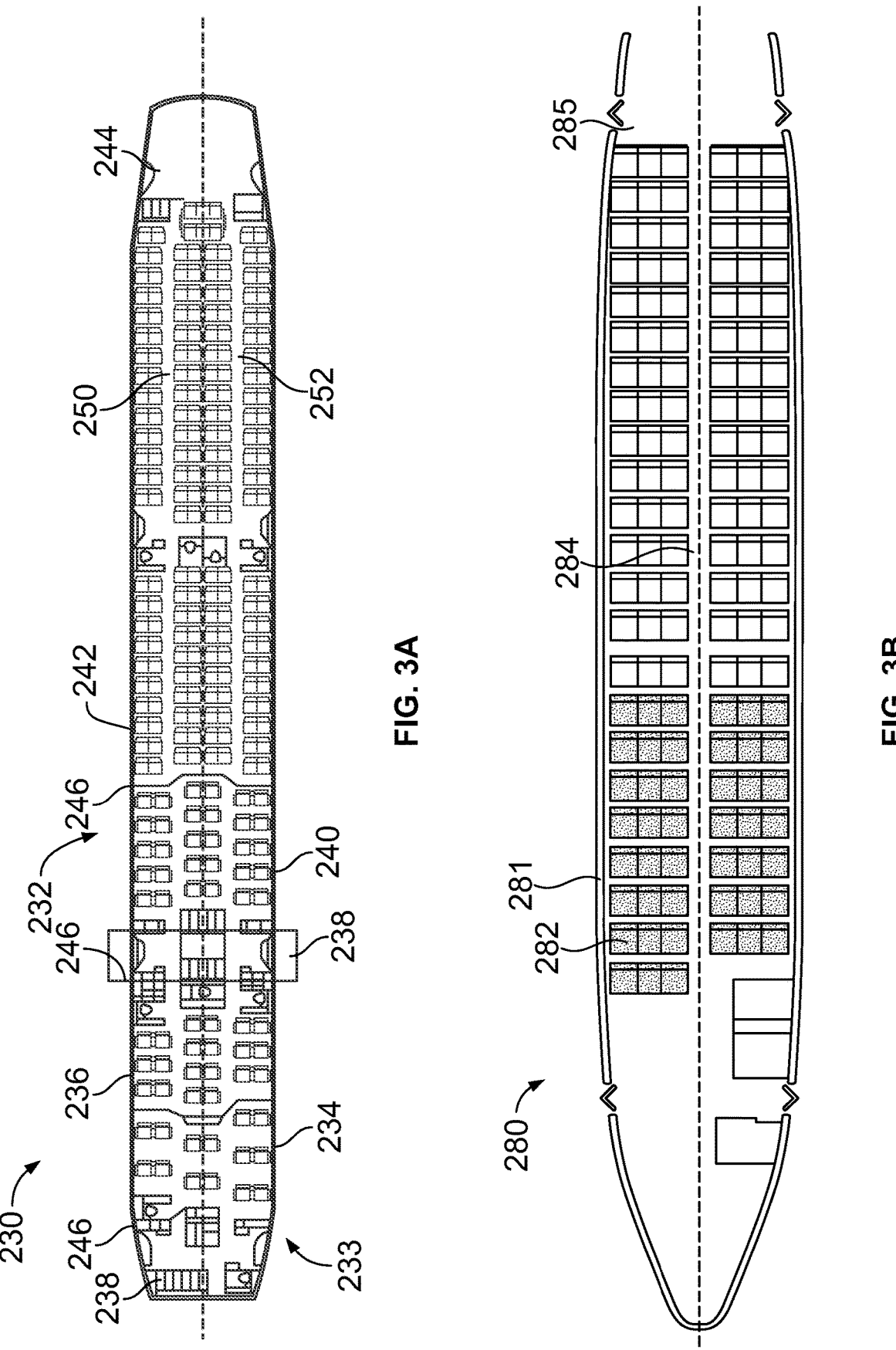
FIG. 3A illustrates a top plan view of an internal cabin of an aircraft, according to an example of the present disclosure.
FIG. 3B illustrates a top plan view of an internal cabin of an aircraft, according to an example of the present disclosure.

FIG. 3A illustrates a top plan view of an internal cabin 230 of an aircraft, according to an example of the present disclosure. The internal cabin 230 may be within the fuselage 232 of the aircraft, such as the fuselage 218 of FIG. 2. For example, one or more fuselage walls may define the internal cabin 230. The internal cabin 230 includes multiple areas, including a front section 233, a first-class section 234, a business class section 236, one or more galley stations 238, an expanded economy or coach section 240, a standard economy of coach section 242, and an aft section 244. It is to be understood that the internal cabin 230 may include more or less areas than shown. For example, the internal cabin 230 may not include a first-class section, and may include more or less galley stations than shown. Each of the sections may be separated by a cabin transition area 246, which may include class divider assemblies between aisles.

As shown in FIG. 3A, the internal cabin 230 includes two aisles 250 and 252 that lead to the aft section 244. Optionally, the internal cabin 230 may have fewer or more aisles than shown. For example, the internal cabin 230 may include a single aisle that extends through the center of the internal cabin 230 that leads to the aft section 244.

FIG. 3B illustrates a top plan view of an internal cabin 280 of an aircraft, according to an example of the present disclosure. The internal cabin 280 is an example of the internal cabin 230 shown in FIG. 2. The internal cabin 280 may be within a fuselage 281 of the aircraft. For example, one or more fuselage walls may define the internal cabin 280. The internal cabin 280 includes multiple areas, including a main cabin 282 having passenger seats, and an aft section 285 behind the main cabin 282. It is to be understood that the internal cabin 280 may include more or less areas than shown.

The internal cabin 280 may include a single aisle 284 that leads to the aft section 285. The single aisle 284 may extend through the center of the internal cabin 280 that leads to the aft section 285. For example, the single aisle 284 may be coaxially aligned with a central longitudinal plane of the internal cabin 280. The aisle can optionally be offset from a centerline of the fuselage.

Figure 4:
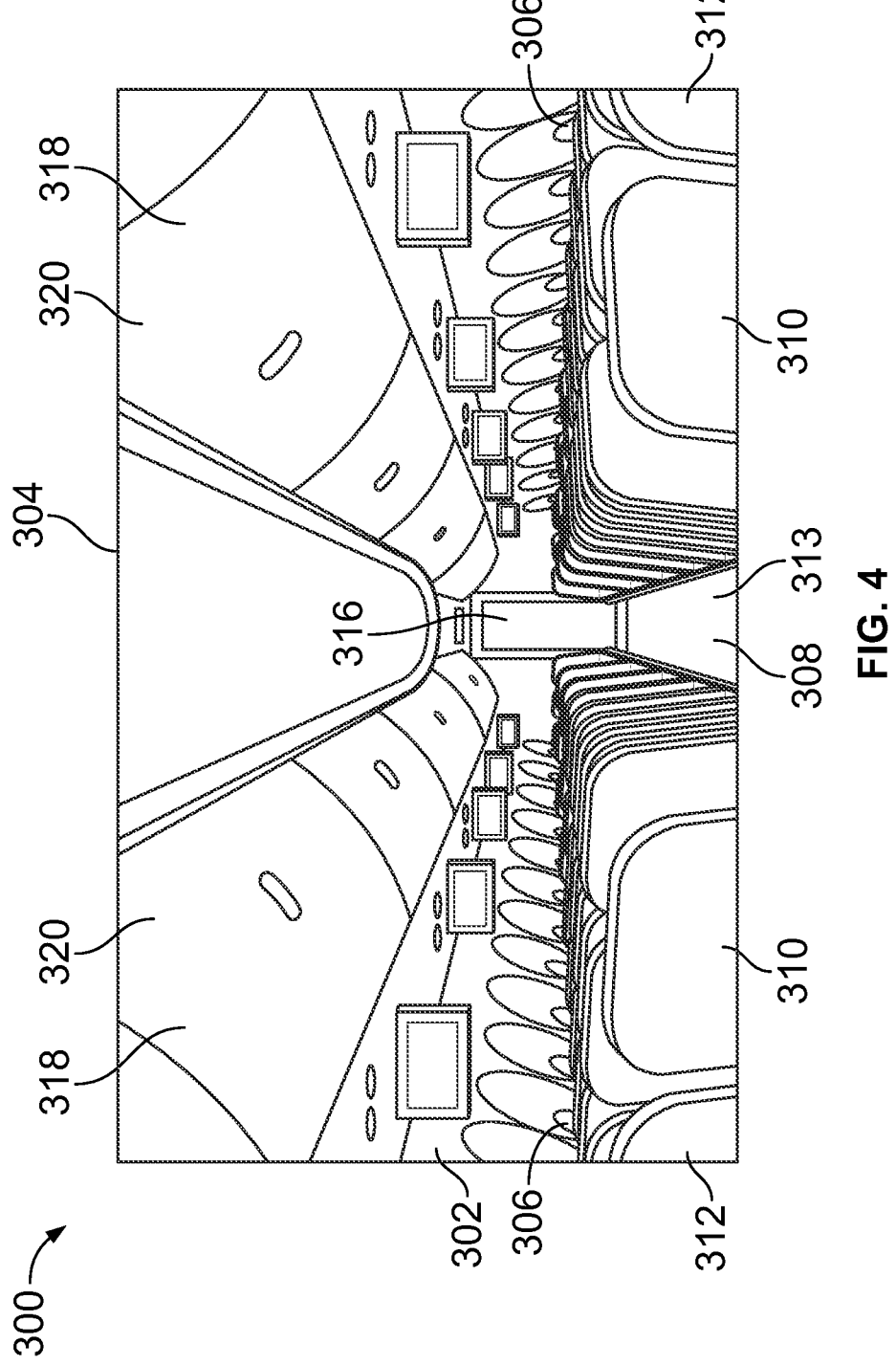
FIG. 4 illustrates a perspective interior view of an internal cabin of an aircraft, according to an example of the present disclosure.

FIG. 4 illustrates a perspective interior view of an internal cabin 300 of an aircraft, according to an example of the present disclosure. The internal cabin 300 is an example of the internal cabin 100 shown in FIG. 1. The internal cabin 300 includes outboard walls 302 connected to a ceiling 304. Windows 306 may be formed within the outboard walls 302. A floor 308 supports rows of seats 310. As shown in FIG. 4, a row 312 may include two seats 310 on either side of an aisle 313. However, the row 312 may include more or less seats 310 than shown. Additionally, the internal cabin 300 may include more aisles than shown.

A flight deck door 316 is at an aft end of a flight deck. The flight deck door 316 in the closed position closes access into the flight deck.

Overhead stowage bin assemblies 318 are secured to the ceiling 304 and/or the outboard wall 302. The overhead stowage bin assemblies 318 are secured over the seats 310. The overhead stowage bin assemblies 318 extend between the front and rear end of the internal cabin 300. Each stowage bin assembly 318 may include a pivot bin or bucket 320 pivotally secured to a strongback. The overhead stowage bin assemblies 318 are configured to be pivoted open in order to receive passenger carry-on baggage and personal items, for example.

Figure 5:
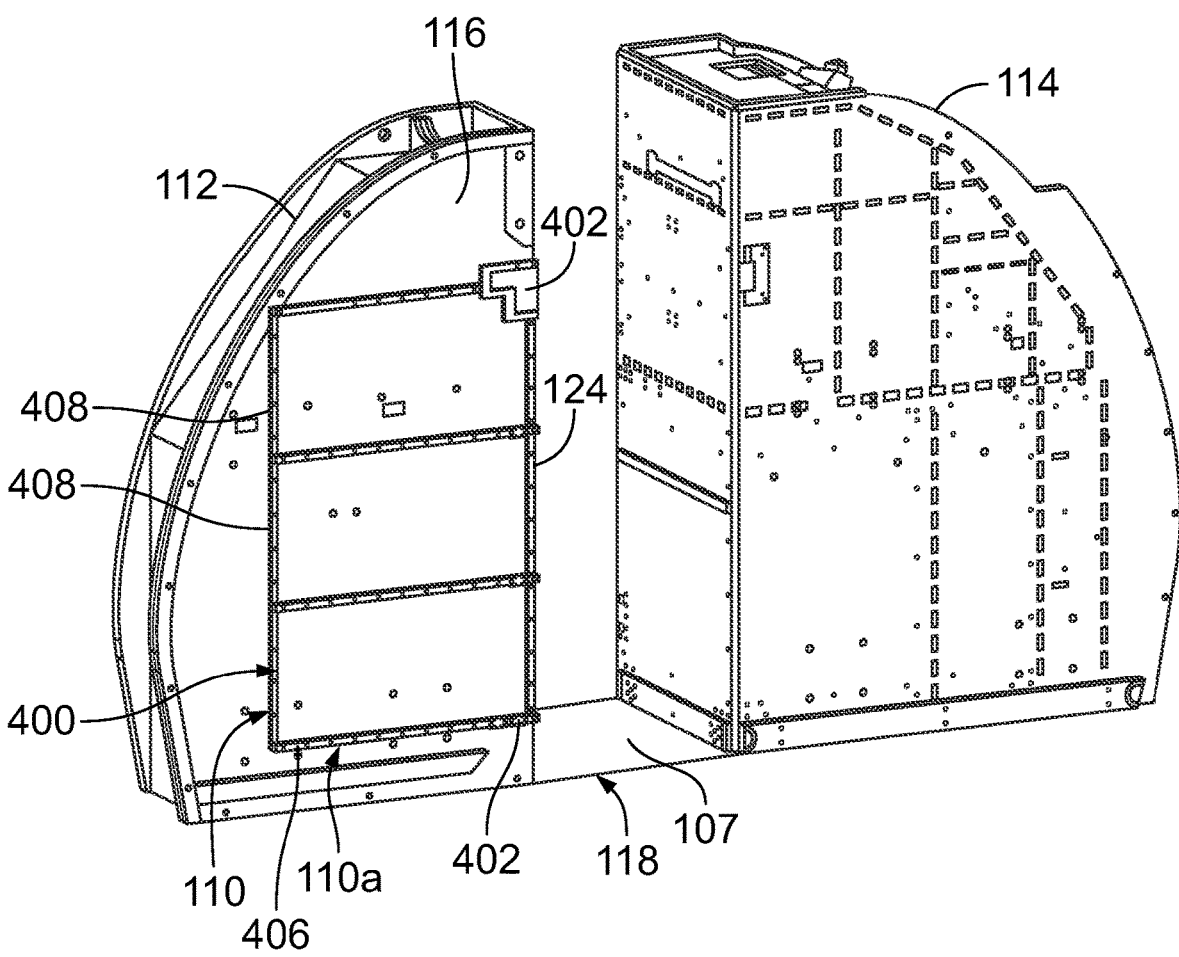
FIG. 5 illustrates an isometric aft view of a secondary barrier door in a stowed position, according to an example of the present disclosure.

FIG. 5 illustrates an isometric aft view of the secondary barrier door 110 in the stowed position 110a, according to an example of the present disclosure. The secondary barrier door 110 includes a main body 400 that is moveably secured to the monument 112 by one or more bearings 402. The bearing(s) 402 are mounted to the aft portion 116 (that is, the portion that is distally located from the flight deck 104, shown in FIG. 1, which is at the forward end of the aircraft 102). The aft portion 116 can be an aft wall, face, panel, surface, and/or the like of the monument 112.

In at least one example, the main body 400 includes a frame 406 including a plurality of panels 408. As shown, the secondary barrier door 110 can include three panels 408.

Optionally, the secondary barrier door 110 can include more or fewer than three panels 408. In at least one example, the main body 400 shown can be a single panel with different sections.

In this stowed position 110a, the secondary barrier door 110 lies behind (that is, aft) the aft portion 116 of the monument 112. As such, the path 118 is open.

Figure 6:
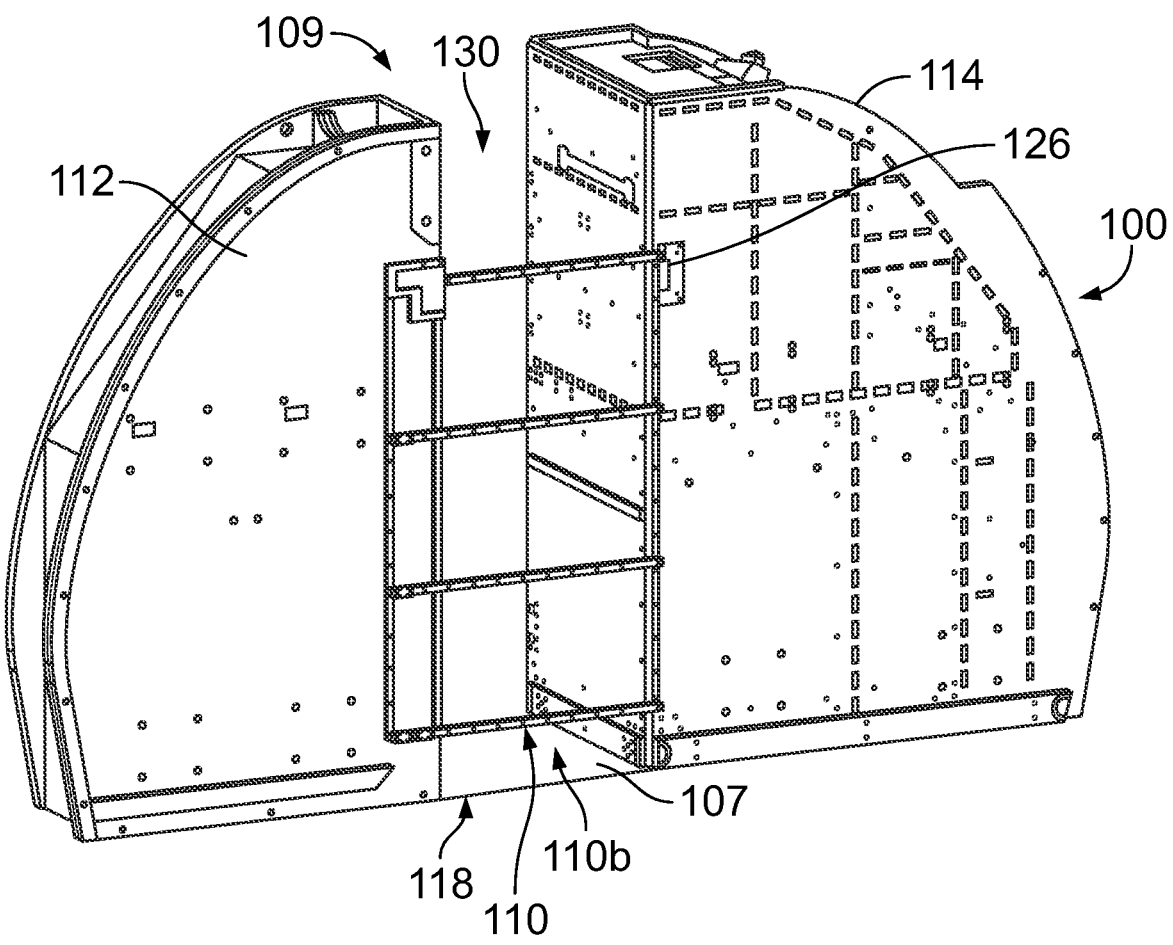
FIG. 6 illustrates an isometric aft view of the secondary barrier door in a deployed position, according to an example of the present disclosure.

FIG. 6 illustrates an isometric aft view of the secondary barrier door 110 in the deployed position 110b, according to an example of the present disclosure. Referring to FIGS. 5 and 6, in order to move the secondary barrier door 110 into the deployed position, the end 124 of the secondary barrier door 110 is grasped, pulled, and linearly slid toward the monument 114. The monument 114 can include the securing device(s) 126, which can securely lock the secondary barrier door 110 in the deployed position, thereby closing the path 118, and providing the security vestibule 130.

As shown, the secondary barrier door 110 may not extend to the floor 107, and/or a ceiling 109 of the internal cabin 100. Optionally, the secondary barrier door 110 may extend to the floor 107, and/or the ceiling 109. As described herein, the secondary barrier door 110 may also include a moveable upper panel that is configured to be moved between a retracted position, and an extended position.

Figure 7:
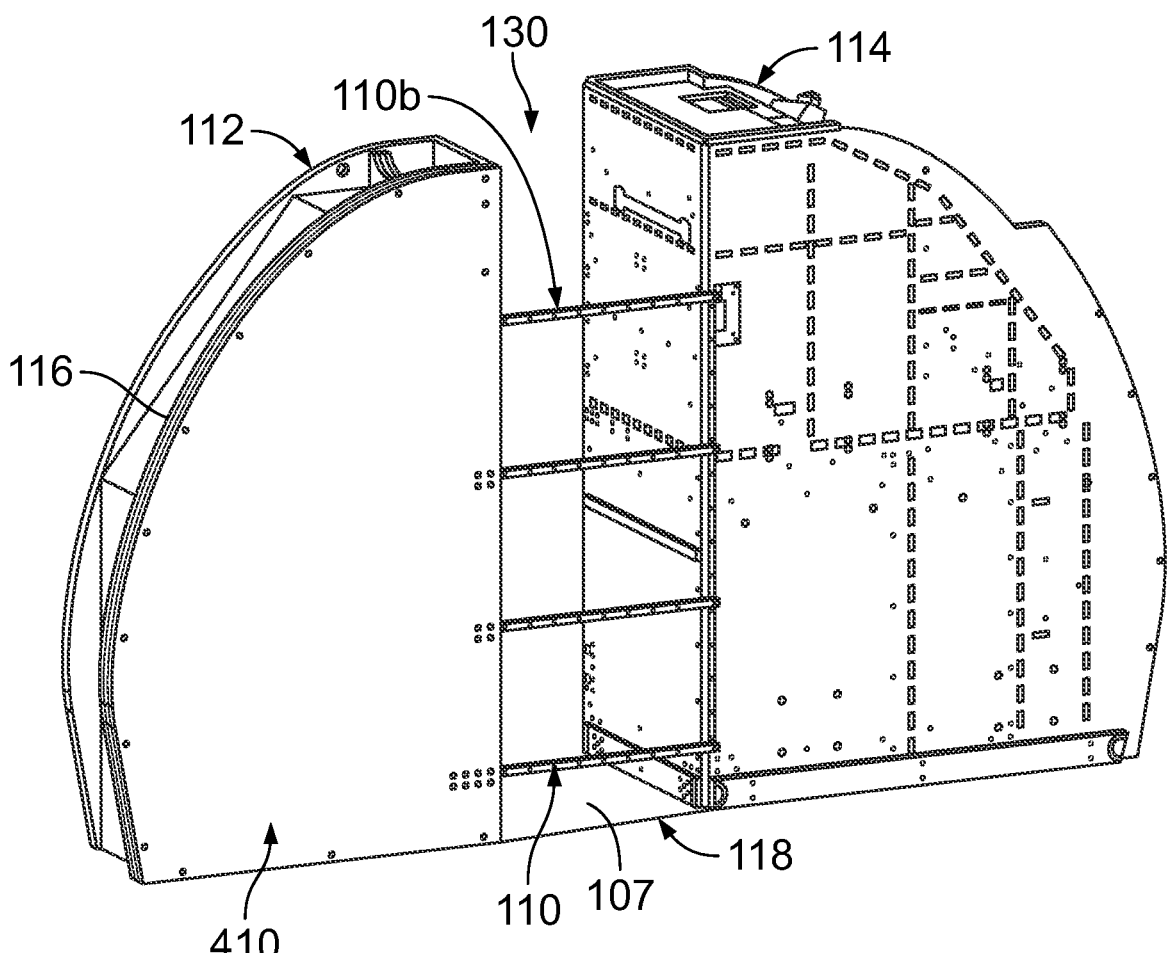
FIG. 7 illustrates an isometric aft view of the secondary barrier door in the deployed position, according to an example of the present disclosure.
Figure 8:
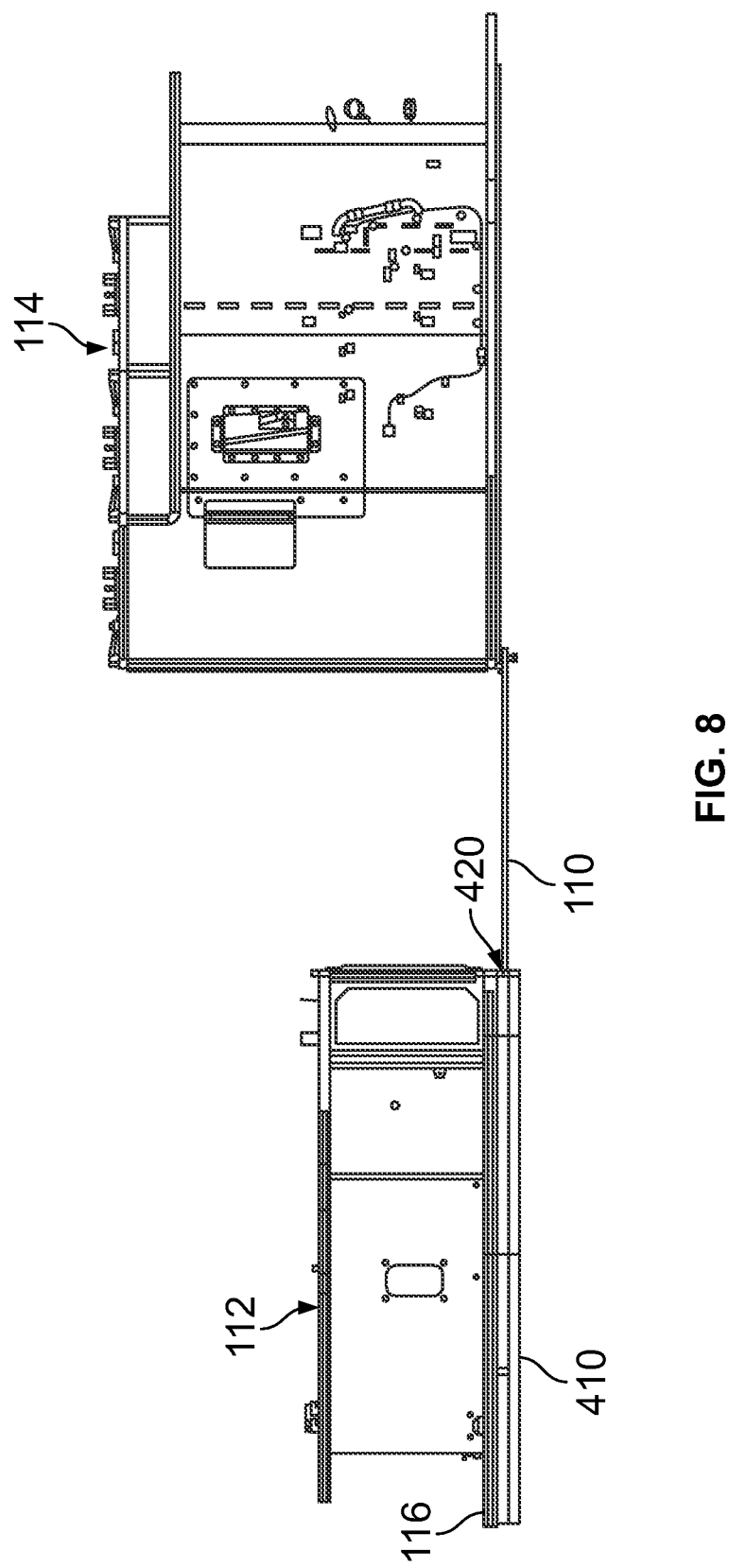
FIG. 8 illustrates a top plan view of the secondary barrier door of FIG. 7.

FIG. 7 illustrates an isometric aft view of the secondary barrier door 110 in the deployed position 110b, according to an example of the present disclosure. FIG. 8 illustrates a top plan view of the secondary barrier door 110 of FIG. 7. Referring to FIGS. 7 and 8, in at least one example, a covering wall 410 can be secured on the aft portion 116 of the monument 112. The covering wall 410 is set apart from the aft portion 116 by one or more spacers (such as blocks, beams, or the like) to define a retaining chamber 420. The secondary barrier door 110 in the stowed position (shown in FIG. 5) is disposed within (for example, securely retained within) the retaining chamber 420. The covering wall 410 provides an aesthetically desirable appearance which covers the secondary barrier door 110 in the stowed position.

In at least one example, the secondary barrier door 110 and the covering wall 410 can be retrofit to a monument within a vehicle. For example, the covering wall 410 can include one or more bearings secured to an interior, forward surface, and the secondary barrier door 110 can be secured to the bearing(s), which can then be secured to the aft portion 116 of the monument 112. Optionally, the monument can be integrally manufactured with the secondary barrier door 110 and the covering wall 410. Alternatively, the monument 112 may not include the covering wall 410.

Figure 9:
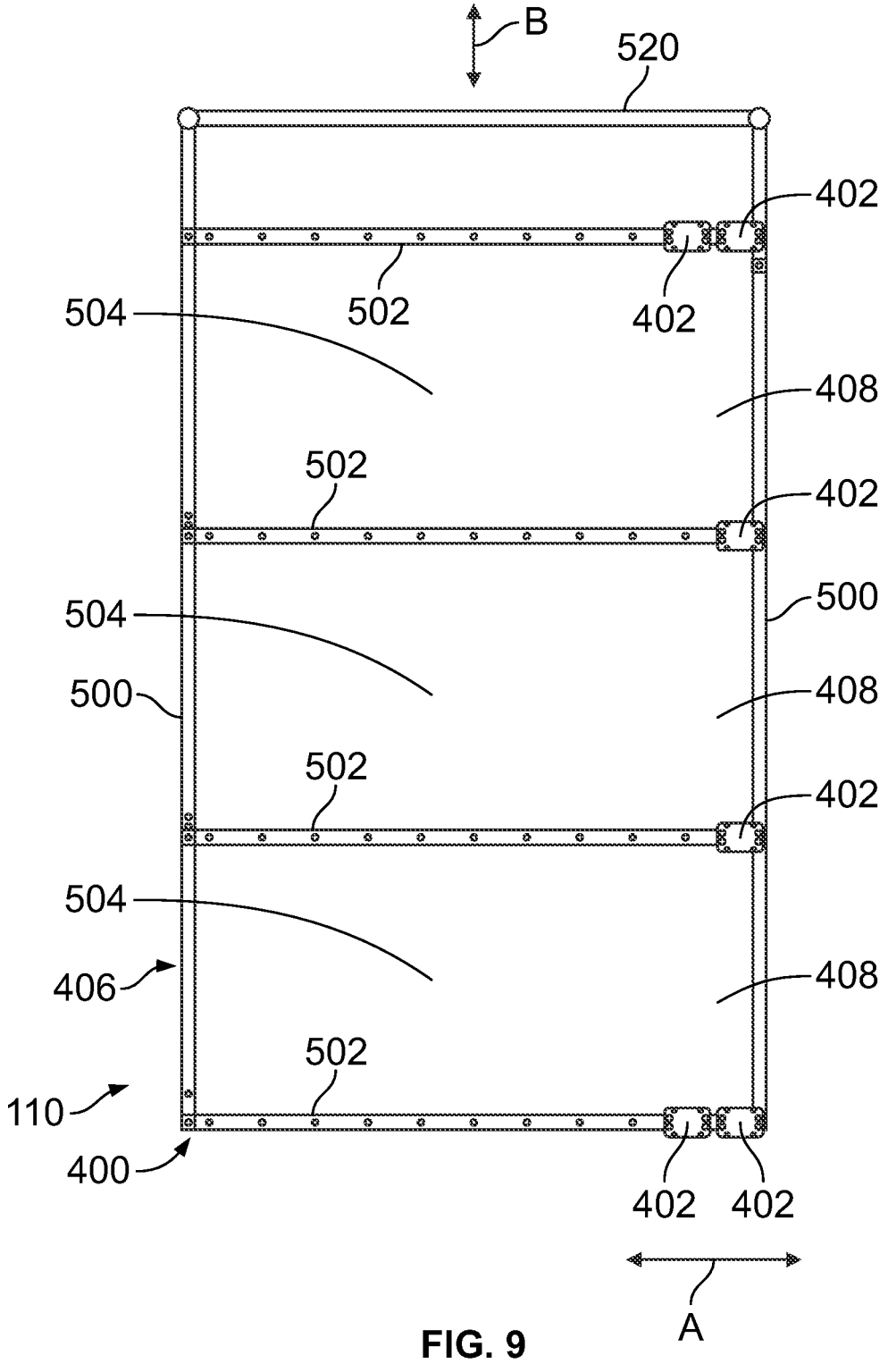
FIG. 9 illustrates a front view of the secondary barrier door, according to an example of the present disclosure.

FIG. 9 illustrates a front view of the secondary barrier door 110, according to an example of the present disclosure. As noted, the secondary barrier door 110 includes the main body 400, which has a frame 406 including panels 408. The frame 406 includes upright rails 500 (such as two vertical rails), and a plurality of cross rails 502 (such as horizontal rails). The panels 408 are defined between the upright rails 500 and the cross rails 502. Each panel 408 can include a rigid wall 504 extending between the upright rails 500 and two cross rails 502. The rigid wall 504 can be transparent or opaque. For example, the rigid wall 504 can be a transparent or opaque plastic panel.

Referring to FIGS. 1, and 5-9, the bearings 402 are secured to one or both of the aft portion 116 of the monument 112 and/or an internal forward surface of the cover covering wall 410. The bearings 402 are configured to slidably retain a portion of the secondary barrier door 110, such as one or more of the cross rails 502. In this manner, the secondary barrier door 110 is configured to linearly slide in the directions of arrows A in relation to the bearings 402. More or fewer bearings 402 than shown can be used.

In at least one example, the secondary barrier door 110 also includes a moveable upper panel 520 that is configured to be moved between a retracted position, and an extended position. The upper panel 520 is moveably coupled to one or more of the panels 408. For example, the upper panel 520 is slidably coupled to the upright rails 500 through one or more bearings, which allow the upper panel 520 to upwardly slide in into the extended position and downwardly slide into the retracted position in the directions of arrows B. As such, when the secondary barrier door 110 is moved into the deployed position 110b, the upper panel 520 can be upwardly slid into the extended position to extend toward the ceiling. In contrast, before moving the secondary barrier door 110 into the stowed position, the upper panel 520 is downwardly slid into the retracted position to allow the secondary barrier door 110 to fit behind the monument 112 within a defined curvature of the internal cabin 100. As another example, the upper panel 520 can be configured to pivot between the retracted position and the extended position, such as via one or more hinges. Optionally, the secondary barrier door 110 may not include the moveable upper panel.

Figure 10:
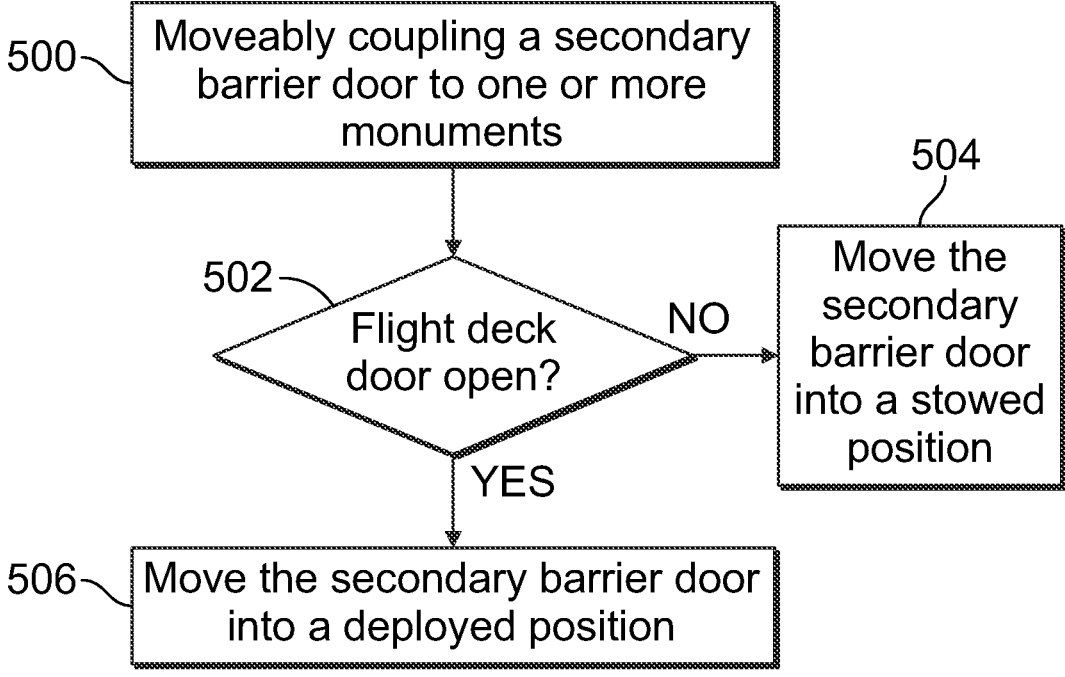
FIG. 10 illustrates a flow chart of a method, according to an example of the present disclosure.

FIG. 10 illustrates a flow chart of a method, according to an example of the present disclosure. Referring to FIGS. 1 and 10, at 500, the secondary barrier door 110 is moveably coupled to one or more monuments 112 and/or 114. At 502, it is determined if the flight deck door 106 is in an open position. If not, the method proceeds to 504, at which the secondary barrier door 110 is moved into (or otherwise maintained in) the stowed position 110a. If, however, the flight deck door 106 is in the open position at 502, the method proceeds to 506, at which the secondary barrier door 110 is moved into the deployed position 110b.

Further, the disclosure comprises embodiments according to the following clauses:

Clause 1. An aircraft, comprising:

a flight deck including a flight deck door configured to be moved between an open position and a closed position;

one or more monuments; and a secondary barrier door moveably coupled to the one or more monuments, wherein the secondary barrier door is configured to linearly slide between a stowed position in which a path to the flight deck is open, and a deployed position in which the path to the flight deck is closed.

Clause 2. The aircraft of Clause 1, wherein the one or more monuments comprise a first monument across an aisle from a second monument, and wherein the secondary barrier door is moveably coupled to the first monument.

Clause 3. The aircraft of Clause 2, wherein the secondary barrier door is slidably coupled to the first monument through one or more bearings.

Clause 4. The aircraft of Clause 3, wherein the one or more bearings are secured to an aft portion of the first monument.

Clause 5. The aircraft of any of Clauses 2-4, wherein the second monument comprises one or more securing devices configured to securely lock the secondary barrier door in the deployed position.

Clause 6. The aircraft of any of Clauses 2-5, wherein a closed security vestibule is defined between the flight deck, the first monument, the second monument, and the secondary barrier door in the deployed position.

Clause 7. The aircraft of any of Clauses 1-6, wherein the secondary barrier door extends across the path in the deployed position.

Clause 8. The aircraft of any of Clauses 1-7, wherein the secondary barrier door comprises a main body having a frame including a plurality of panels.

Clause 9. The aircraft of Clause 8, wherein the secondary barrier door further comprises a moveable upper panel configured to be moved between a retracted position and an extended position.

Clause 10. The aircraft of any of Clauses 1-9, further comprising a covering wall secured to the one or more monuments, wherein a retaining chamber is defined between the covering wall and the one or more monuments, and wherein the secondary barrier wall in the stowed position is disposed within the retaining chamber.

Clause 11. A method, comprising:

moving a flight deck door between a closed position and an open position; and moving a secondary barrier door between a stowed position when the flight deck door is in the closed position, and a deployed position when the flight deck door is in the open position, wherein said moving comprises linearly sliding the secondary barrier door between the stowed position and the deployed position, wherein the secondary barrier door is moveably coupled to one or more monuments, wherein a path to the flight deck is open when the secondary barrier door is in the stowed position, and wherein the path to the flight deck is closed when the secondary barrier door is in the deployed position.

Clause 12. The method of Clause 11, wherein the one or more monuments comprise a first monument across an aisle from a second monument, and wherein the secondary barrier door is moveably coupled to the first monument.

Clause 13. The method of Clause 12, wherein the secondary barrier door is slidably coupled to the first monument through one or more bearings.

Clause 14. The method of Clause 13, wherein the one or more bearings are secured to an aft portion of the first monument.

Clause 15. The method of any of Clauses 12-14, wherein the second monument comprises one or more securing devices configured to securely lock the secondary barrier door in the deployed position.

Clause 16. The method of any of Clauses 12-15, further comprising defining a closed security vestibule between the flight deck, the first monument, the second monument, and the secondary barrier door in the deployed position.

Clause 17. The method of any of Clauses 11-16, wherein the secondary barrier door extends across the path in the deployed position.

Clause 18. The method of any of Clauses 11-17, further comprising moving a moveable upper panel of the secondary barrier door between a retracted position when the secondary barrier door is in the stowed position, and an extended position when the secondary barrier door is in the deployed position.

Clause 19. The method of any of Clauses 11-18, further comprising disposing the secondary barrier wall in the stowed position within a retaining chamber defined between a covering and the one or more monuments.

Clause 20. An aircraft, comprising:

a flight deck including a flight deck door configured to be moved between an open position and a closed position;

a first monument;

a second monument across an aisle from the first monument;

a secondary barrier door moveably coupled to the first monument, wherein the secondary barrier door is slidably coupled to the first monument through one or more bearings secured to an aft portion of the first monument, wherein the secondary barrier door is configured to linearly slide between a stowed position in which a path to the flight deck is open, and a deployed position in which the path to the flight deck is closed, and wherein a closed security vestibule is defined between the flight deck, the first monument, the second monument, and the secondary barrier door in the deployed position; and a covering wall secured to the first monument, wherein a retaining chamber is defined between the covering wall and the first monument, and wherein the secondary barrier wall in the stowed position is disposed within the retaining chamber.

As described herein, examples of the present disclosure provide barrier systems and methods for preventing access to a flight deck during a door transition. Further, examples of the present disclosure provide efficient and effective systems and methods for providing a secondary barrier to a flight deck.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, aft may be changed to forward, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An aircraft, comprising:
an internal cabin having a ceiling;
a flight deck including a flight deck door configured to be moved between an open position and a closed position;
one or more monuments; and
a secondary barrier door moveably coupled to the one or more monuments, wherein the secondary barrier door is configured to linearly slide between a stowed position in which a path to the flight deck is open, and a deployed position in which the path to the flight deck is closed, the secondary barrier door comprising a moveable upper panel configured to be moved between a retracted position and an extended position,
wherein the extended position extends a height of the secondary barrier door toward the ceiling, and the retracted position allows the secondary barrier door to fit behind the one or more monuments within a defined curvature of the internal cabin.

2. The aircraft of claim 1, wherein the one or more monuments comprise a first monument across an aisle from a second monument, and wherein the secondary barrier door is moveably coupled to the first monument.

3. The aircraft of claim 2, wherein the secondary barrier door is slidably coupled to the first monument through one or more bearings.

4. The aircraft of claim 3, wherein the one or more bearings are secured to an aft portion of the first monument.

5. The aircraft of claim 2, wherein the second monument comprises one or more securing devices configured to securely lock the secondary barrier door in the deployed position.

6. The aircraft of claim 2, wherein a closed security vestibule is defined between the flight deck, the first monument, the second monument, and the secondary barrier door in the deployed position.

7. The aircraft of claim 1, wherein the secondary barrier door extends across the path in the deployed position.

8. The aircraft of claim 1, wherein the secondary barrier door comprises a main body having a frame including a plurality of panels.

9. The aircraft of claim 1, further comprising a covering wall secured to the one or more monuments, wherein a retaining chamber is defined between the covering wall and the one or more monuments, and wherein the secondary barrier wall in the stowed position is disposed within the retaining chamber.

10. A method, comprising:
moving a flight deck door between a closed position and an open position; and moving a secondary barrier door between a stowed position when the flight deck door is in the closed position, and a deployed position when the flight deck door is in the open position, wherein said moving comprises linearly sliding the secondary barrier door between the stowed position and the deployed position, wherein the secondary barrier door is moveably coupled to one or more monuments, wherein a path to the flight deck is open when the secondary barrier door is in the stowed position, wherein the path to the flight deck is closed when the secondary barrier door is in the deployed position, the secondary barrier door comprising a moveable upper panel configured to be moved between a retracted position and an extended position, and wherein the extended position extends a height of the secondary barrier door toward a ceiling of the internal cabin, and the retracted position allows the secondary barrier door to fit behind the one or more monuments within a defined curvature of the internal cabin.

11. The method of claim 10, wherein the one or more monuments comprise a first monument across an aisle from a second monument, and wherein the secondary barrier door is moveably coupled to the first monument.

12. The method of claim 11, wherein the secondary barrier door is slidably coupled to the first monument through one or more bearings.

13. The method of claim 12, wherein the one or more bearings are secured to an aft portion of the first monument.

14. The method of claim 11, wherein the second monument comprises one or more securing devices configured to securely lock the secondary barrier door in the deployed position.

15. The method of claim 11, further comprising defining a closed security vestibule between the flight deck, the first monument, the second monument, and the secondary barrier door in the deployed position.

16. The method of claim 10, wherein the secondary barrier door extends across the path in the deployed position.

17. The method of claim 10, further comprising moving the moveable upper panel of the secondary barrier door between the retracted position when the secondary barrier door is in the stowed position, and the extended position when the secondary barrier door is in the deployed position.

18. The method of claim 10, further comprising disposing the secondary barrier wall in the stowed position within a retaining chamber defined between a covering and the one or more monuments.

19. An aircraft, comprising:

an internal cabin having a ceiling;

a flight deck including a flight deck door configured to be moved between an open position and a closed position;

a first monument;

a second monument across an aisle from the first monument;

a secondary barrier door moveably coupled to the first monument, wherein the secondary barrier door is slidably coupled to the first monument through one or more bearings secured to an aft portion of the first monument, wherein the secondary barrier door is configured to linearly slide between a stowed position in which a path to the flight deck is open, and a deployed position in which the path to the flight deck is closed, wherein a closed security vestibule is defined between the flight deck, the first monument, the second monument, and the secondary barrier door in the deployed position, the secondary barrier door comprising a moveable upper panel configured to be moved between a retracted position and an extended position, and wherein the extended position extends a height of the secondary barrier door toward the ceiling and the retracted position allows the secondary barrier door to fit behind the one or more monuments within a defined curvature of the internal cabin; and a covering wall secured to the first monument, wherein a retaining chamber is defined between the covering wall and the first monument, and wherein the secondary barrier wall in the stowed position is disposed within the retaining chamber.

20. The aircraft of claim 19, wherein the second monument comprises one or more securing devices configured to securely lock the secondary barrier door in the deployed position.

\* \* \* \* \*